(12) United States Patent
Fujii (10) Patent No.: US 11,249,223 B2
(45) Date of Patent: Feb. 15, 2022

(54) BASE WITH LOW-REFLECTION FILM (71) Applicant: AGC Inc., Chiyoda-ku (JP)

(72) Inventor: Kensuke Fujii, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 81 days.

(21) Appl. No.: 15/787,167

(22) Filed: Oct. 18, 2017

(65) Prior Publication Data

US 2018/0038995 A1 Feb. 8, 2018

Related U.S. Application Data (63) Continuation of application No. PCT/JP2016/063964, filed on May 11, 2016.

(30) Foreign Application Priority Data

May 12, 2015 (JP) .............................. JP2015-097652

(51) Int. Cl.
*G02B 1/115* (2015.01)
*B32B 7/02* (2019.01)
(Continued)

(52) U.S. Cl.
CPC ................ *G02B 1/115* (2013.01); *B32B 7/02* (2013.01); *G02B 1/18* (2015.01); *G02B 5/0294* (2013.01); *G02B 5/28* (2013.01); *G02F 2201/38* (2013.01)

(58) Field of Classification Search
None
See application file for complete search history.

(56) References Cited

U.S. PATENT DOCUMENTS

2010/0295196 A1* 11/2010 Lee ..................... G02B 5/005
264/1.38
2011/0033679 A1* 2/2011 Fukawa ............. C03C 17/3441
428/212

(Continued)

FOREIGN PATENT DOCUMENTS

CN 103666007 A 3/2014
CN 104118994 A 10/2014
(Continued)

OTHER PUBLICATIONS

International Search Report dated Aug. 2, 2016 in PCT/JP2016/063964, filed on May 11, 2016 (with English Translation).
(Continued)

*Primary Examiner* — Christopher Stanford
*Assistant Examiner* — Journey F Sumlar
(74) *Attorney, Agent, or Firm* — Oblon, McClelland, Maier & Neustadt, L.L.P.

(57) ABSTRACT

A base with a low-reflection film includes: a transparent base; a low-reflection film formed on a first principal surface of the transparent base; and a black printed part formed on a part of a second principal surface of the transparent base opposite to the first principal surface, in which a luminous reflectance R of the base with the low-reflection film with respect to incident light from the low-reflection film side is 2% or less in a region of the transparent base having the black printed part, and a ratio $R_1/R_2$ between a luminous reflectance $R_1$ of a surface of the low-reflection film and a luminous reflectance $R_2$ at an interface of the black printed part with the transparent base is ⅙ or more.

16 Claims, 1 Drawing Sheet (51) Int. Cl.
*G02B 1/18* (2015.01)
*G02B 5/28* (2006.01)
*G02B 5/02* (2006.01)

(56) References Cited

U.S. PATENT DOCUMENTS

2014/0178635 A1\* 6/2014 Imaizumi ............... B60J 1/007
  428/138
2014/0238952 A1\* 8/2014 Makino .................. C03C 15/00
  216/2
2015/0289384 A1\* 10/2015 Iwashita ................ H05K 3/185
  174/250

FOREIGN PATENT DOCUMENTS

| | | |
|---|---|---|
| DE | 197 82 149 B4 | 5/2009 |
| DE | 10 2015 114 877 A1 | 3/2017 |
| JP | 2003-108018 | 4/2003 |
| JP | 2005-242265 | 9/2005 |
| JP | 2006-206782 | 8/2006 |
| JP | 2012-8159 | 1/2012 |
| JP | 2012-256067 | 12/2012 |
| JP | 5370150 | 12/2013 |
| JP | 2014-16459 | 1/2014 |
| JP | 2014-58652 | 4/2014 |
| JP | 2014-224979 | 12/2014 |
| KR | 10-2014-0037759 | 3/2014 |
| KR | 10-2014-0126663 | 10/2014 |
| TW | 200921141 | 5/2009 |
| TW | 201412904 A | 4/2014 |
| TW | 201442971 A | 11/2014 |
| TW | 201504163 A | 2/2015 |
| WO | WO 2009/001723 A1 | 12/2008 |
| WO | WO 2014/199991 A1 | 12/2014 |

OTHER PUBLICATIONS

Written Opinion dated Aug. 2, 2016 in PCT/JP2016/063964, filed on May 11, 2016.

\* cited by examiner

BASE WITH LOW-REFLECTION FILM

CROSS-REFERENCE TO RELATED APPLICATIONS

This application is a continuation of prior International Application No. PCT/JP2016/063964, filed on May 11, 2016 which is based upon and claims the benefit of priority from Japanese Patent Application No. 2015-097652, filed on May 12, 2015; the entire contents of all of which are incorporated herein by reference.

FIELD

The present invention relates to a base with a low-reflection film.

BACKGROUND

In recent years, in display devices such as a tablet type PC (Personal Computer), a smartphone, a car navigation system, and a touch panel, there is provided a front substrate such as a cover glass on a visible side of a display panel, for the purpose of protecting the display panel. Further, there is provided a low-reflection film which suppresses reflection of light, on a surface of a visible side of the front substrate, for the purpose of increasing visibility of display by suppressing the glare caused by the reflection of light. Further, in the front base with the low-reflection film as above, a light shielding part such as a black printed part is provided to a peripheral part of a surface on the non-visible side on which the low-reflection film is not provided, for the purpose of improving the design and the beautiful appearance (refer to JP-A 2005-242265, for example).

SUMMARY OF THE INVENTION

Problems to be Solved by the Invention

However, in a front substrate for display provided with a low-reflection film and a black printed part, there has been a problem such that, since reflection of light is suppressed by the low-reflection film, when the black printed part is seen from a side of a surface on which the low-reflection film is provided, printing unevenness of the black printed part is visually recognized. It can be considered that this is caused by a failure in kneaded state of a printing material, a printing failure due to deterioration of a printing surface of a transparent base in the front substrate, coating unevenness at a time of printing, or the like. Further, in order to solve the problem regarding the kneading failure or the printing failure, improvement of the device of manufacturing the printing material and the printing device, reform of the surface of the transparent base, enhancement of printing accuracy, and the like are required, and thus it has been difficult to solve the problem in terms of printing techniques and costs.

The present invention is made by dealing with the above-described problems, and an object thereof is to provide a base with a low-reflection film in which printing unevenness of a black printed part is hard to be visually recognized, which is provided with a high display performance and a beautiful appearance, and which is suitable for a front substrate of a display device or the like.

Means of Solving the Problems

A base with a low-reflection film is characterized in that it includes: a transparent base; a low-reflection film formed on a first principal surface of the transparent base; and a black printed part formed on a part of a second principal surface of the transparent base opposite to the first principal surface, wherein a luminous reflectance R of the base with the low-reflection film with respect to incident light from the low-reflection film side is 2% or less in a region of the transparent base having the black printed part, and a ratio $R_1/R_2$ between a luminous reflectance $R_1$ of a surface of the low-reflection film and a luminous reflectance $R_2$ at an interface of the black printed part with the transparent base is $\frac{1}{6}$ or more.

In the base with the low-reflection film of the present invention, the luminous reflectance R of the base with the low-reflection film is preferably 1.2% or less. Further, the luminous reflectance $R_1$ of the surface of the low-reflection film is preferably 1% or less. Further, the luminous reflectance $R_2$ at the interface of the black printed part with the transparent base is 0.8% or less. Further, the transparent base preferably has a projecting and recessed shape on the first principal surface. Further, a surface roughness RMS of the projecting and recessed shape is preferably not less than 0.01 µm nor more than 0.5 µm. Further, an average length RSm of a roughness curve element of the projecting and recessed shape is preferably not less than 5 µm nor more than 30 µm. Further, a haze value defined by JIS K 7136 of the transparent base is preferably not less than 1% nor more than 30%. Further, it is preferable that the base with the low-reflection film further includes an antifouling film formed on the low-reflection film and having a film thickness of not less than 2 nm nor more than 20 nm. Further, it is preferable that the low-reflection film has at least one layer made of niobium oxide or silicon nitride, and at least one layer made of silicon oxide. Further, the transparent base is preferably a glass substrate.

In the present invention, "a region of the transparent base having the black printed part" indicates a region where the base with the low-reflection film has the black printed part in a traverse cross section (a cross section along a thickness direction). In the description hereinafter, "the region having the black printed part" is also referred to as "a region provided with the black printed part." Further, a region where the base with the low-reflection film does not have the black printed part in the traverse cross section is also referred to as "a region having no black printed part."

Advantages of the Invention

A base with a low-reflection film of the present invention has the low-reflection film whose luminous reflectance with respect to incident light from the low-reflection film side in a region having a black printed part is adjusted, so that printing unevenness of the black printed part is hard to be visually recognized, and thus the base with the low-reflection film of the present invention is excellent in terms of a display performance and a beautiful appearance. Therefore, by using such a base with the low-reflection film as a front substrate, it is possible to improve visibility of display of a display device, and to supply an excellent design and a beautiful appearance.

EMBODIMENTS FOR CARRING OUT THE INVENTION

Hereinafter, embodiments for carrying out the present invention will be described. The present invention is not limited to the following embodiments, and the following embodiments may be modified and replaced in various ways without departing from the scope of the present invention.

Figure 1:
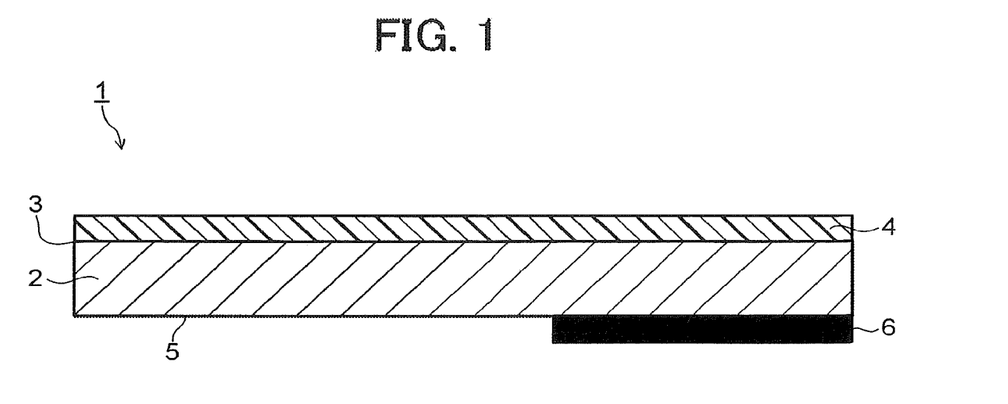
FIG. 1 is a sectional view schematically illustrating an embodiment of a base with a low-reflection film of the present invention.

FIG. 1 is a sectional view schematically illustrating an embodiment of a base with a low-reflection film of the present invention. As illustrated in FIG. 1, a base 1 with a low-reflection film of an embodiment includes a transparent base 2, a low-reflection film 4 formed on a first principal surface 3 being one principal surface of the transparent base 2, and a black printed part 6 formed on a part of a second principal surface 5 being the other principal surface of the transparent base 2. The first principal surface 3 and the second principal surface 5 are opposite to each other. Further, in the base 1 with the low-reflection film of the embodiment, a luminous reflectance R of the base 1 with the low-reflection film with respect to incident light from the low-reflection film 4 side is 2% or less in a region of the transparent base 2 having the black printed part 6, and a ratio ($R_1/R_2$) between a luminous reflectance $R_1$ of a surface of the low-reflection film 4 and a luminous reflectance $R_2$ at an interface of the black printed part 6 with the transparent base 2 is ⅙ or more.

Here, the luminous reflectance is a stimulus value Y of reflection defined by JIS Z 8701. In the present invention, a spectrophotometric colorimeter (manufactured by KONICA MINOLTA, INC., model: CM-2600d) is used, and reflected light is measured by an SCI mode in which regular reflected light and diffused reflected light are collectively measured under a light source of D65, and the measured reflectance is used to calculate the luminous reflectance.

In the base 1 with the low-reflection film of the present invention, the luminous reflectance of the base 1 with the low-reflection film measured with respect to incident light from the low-reflection film 4 side (hereinafter, also referred to as a luminous reflectance R) is 2% or less, and $R_1/R_2$ is ⅙ or more, so that printing unevenness of the black printed part 6 is hard to be visually recognized from the low-reflection film 4 side.

The luminous reflectance R is preferably 1.5 or less, more preferably 1.2% or less, and still more preferably 1% or less. Further, from a viewpoint of increasing the visibility of display by suppressing the reflection of light, the luminous reflectance $R_1$ is preferably 1% or less, preferably 0.8% or less, and more preferably 0.7% or less.

Figure 2:
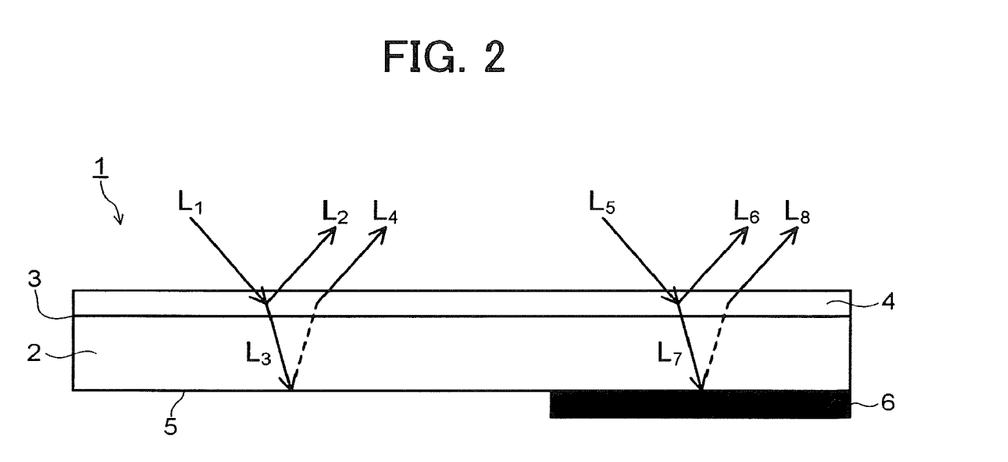
FIG. 2 is a view schematically illustrating routes of light which is incident from the low-reflection film side, in the base with the low-reflection film of the present invention.

Hereinafter, a calculation method of $R_1$ and $R_2$ will be described based on FIG. 2. FIG. 2 is a view schematically illustrating routes (optical paths) of incident light which is incident on the base 1 with the low-reflection film of the present invention from the low-reflection film 4 side. In FIG. 2, components same as those in FIG. 1 are denoted by the same reference numerals.

In a region of the base 1 with the low-reflection film having no black printed part 6, a part of incident light $L_1$ which is incident on the low-reflection film 4 from the first principal surface 3 side, that is, from the opposite side of the second principal surface 5, is reflected by the surface of the low-reflection film 4 to be reflected light $L_2$, and the rest of the incident light $L_1$ becomes transmitted light $L_3$ which transmits through the low-reflection film 4 and the transparent base 2 in this order. A part of the transmitted light $L_3$ is reflected by the second principal surface 5 of the transparent base 2 and the reflected light transmits through the transparent base 2 and the low-reflection film 4 in this order, and is emitted to the outside as emitted light $L_4$. The routes of the light ($L_1 \rightarrow L_2$ and $L_1 \rightarrow L_3 \rightarrow L_4$) are set to a first route.

A luminous reflectance $R_G$ of the light of the first route corresponds to a sum of a luminous reflectance regarding the reflected light $L_2$, namely, the luminous reflectance $R_1$ of the low-reflection film 4, and a luminous reflectance $R_4$ regarding the emitted light $L_4$.

Here, the luminous reflectance $R_4$ is represented by Formula (I) using reflectances along the route of the light, and the luminous reflectance $R_G$ of the light of the first route is represented by Formula (II). Note that $R_0$ is a one-side luminous reflectance obtained from the second principal surface 5 of the transparent base 2.

$$R_4 = (1-R_1) \times R_0 \times (1-R_1) \quad (I)$$

$$R_G = R_1 + (1-R_1) \times R_0 \times (1-R_1) \quad (II)$$

On the other hand, in a region of the base 1 with the low-reflection film provided with the black printed part 6, a part of incident light $L_5$ which is incident on the low-reflection film 4 from the first principal surface 3 side, that is, from the opposite side of the second principal surface 5, is reflected by the surface of the low-reflection film 4 to be reflected light $L_6$, and the rest of the incident light $L_5$ becomes transmitted light $L_7$ which transmits through the low-reflection film 4 and the transparent base 2 in this order. A part of the transmitted light $L_7$ is reflected by an interface between the second principal surface 5 of the transparent base 2 and the black printed part 6, and the reflected light transmits through the transparent base 2 and the low-reflection film 4 in this order, and then is emitted to the outside as emitted light $L_8$. The routes of the light ($L_5 \rightarrow L_6$ and $L_5 \rightarrow L_7 \rightarrow L_8$) are set to a second route.

A luminous reflectance $R_{tot}$ of the light of the second route corresponds to a sum of a luminous reflectance regarding the reflected light $L_6$, namely, the luminous reflectance $R_1$ of the low-reflection film 4, and a luminous reflectance $R_8$ regarding the emitted light $L_8$.

Here, the luminous reflectance $R_8$ is represented by Formula (III) using reflectances along the route of the light, and the luminous reflectance $R_{tot}$ of the light of the second route is represented by Formula (IV). Note that $R_2$ is a luminous reflectance of the black printed part 6 at the interface with the transparent base 2.

$$R_8 = (1-R_1) \times R_2 \times (1-R_1) \quad (III)$$

$$R_{tot} = R_1 + (1-R_1) \times R_2 \times (1-R_1) \quad (IV)$$

In the base 1 with the low-reflection film, the luminous reflectance $R_G$ in the region having no black printed part 6 and the luminous reflectance $R_{tot}$ in the region provided with the black printed part 6 are measurable amounts. Therefore, with the given luminous reflectance $R_0$ of the transparent base 2 set as a premise, it is possible to calculate $R_1$ and $R_2$ by using the aforementioned Formula (II) and Formula (IV). Note that as described above, $R_{tot}$ corresponds to the luminous reflectance R measured with respect to the incident light from the low-reflection film 4 side in the region having the black printed part 6, and is 2% or less in the base 1 with the low-reflection film of the present invention. Further, the luminous reflectance $R_0$ can be calculated by determining, with an ellipsometer, for example, a refractive index of a rear surface of the transparent base 2 in the region having no black printed part 6, namely, the transparent base 2 on the side on which the low-reflection film 4 is not provided.

Further, when the low-reflection film 4 has absorption of absorptance $A_1$, it is possible to calculate $R_1$ and $R_2$ in a similar manner to the above by setting $(1-R_1)$ to $(1-R_1-A_1)$ in Formulas (II) and (IV). The absorptance $A_1$ of the low-reflection film 4 can be calculated by comparing a transmittance $T_g$ in the region where the second principal surface 5 of the transparent base 2 does not have the black printed part 6 and a transmittance $T_0$ of only the transparent base 2.

Note that actually, regarding the light, out of the transmitted light $L_3$, for example, which is reflected by the second principal surface 5 of the transparent base 2 and which transmits through the transparent base 2 and the low-reflection film 4 in this order, a part thereof is emitted from the inside of the transparent base 2 as the emitted light $L_4$, and a part thereof follows a route such that it is reflected by an interface between the low-reflection film 4 and the air to return to the inside of the transparent base 2, transmits through the transparent base 2, and a part thereof is reflected by the second principal surface 5 of the transparent base 2 to be emitted from the inside of the transparent base 2. Further, it is possible to consider a route in which this cycle is repeated an arbitrary number of times. However, as long as $R_1$ and $R_2$ fall within the above-described range, a contribution from the routes after $L_8$ is sufficiently small in a negligible degree.

The luminous reflectance $R_1$ of the low-reflection film 4 is arbitrarily adjustable based on the composing material of each layer forming the low-reflection film 4, the stacking number, the thickness of each layer, the stacking order, and the like. The luminous reflectance $R_2$ of the black printed part 6 at the interface with the transparent base 2 can be adjusted by the kind of material (a black ink or the like) forming the black printed part 6, the film thickness, and the like. Note that $R_2$ is normally in a range of not less than 0.3% nor more than 0.8%, and since the adjustment is difficult to be performed by the kind of ink, the film thickness, and the like, and there is a possibility of impairing the black color tone, it is preferable to adjust the ratio of $R_1/R_2$ by adjusting the value of $R_1$.

When a film having absorbency is used as the low-reflection film 4, $R_{tot}$ is lowered when compared to a case where a film whose $R_1$ and $R_2$ respectively have the same values and which has no absorption is used, so that a black feeling when seen by a user is improved. Therefore, the low-reflection film 4 can be favorably used for a product which is not required to have a high transmittance of the opening (the unprinted part). In this case, it is possible to favorably use a film made by stacking a light absorption film which uses a nitride film of titanium, zirconium, or the like, for example, as a main material, and a silicon oxide film in this order. A geometrical film thickness of the light absorption film is preferably 5 to 25 nm, and a geometrical film thickness of the silicon oxide film is preferably 70 to 110 nm. Optionally, a layer whose geometrical film thickness is 1 to 20 nm and which uses silicon or silicon nitride as a main component may be provided between the light absorption film and the silicon oxide film. Note that here, a film which uses a certain component as a main material refers to a film in which a proportion of the component is 50 mass % or more.

Next, each of the elements configuring the base 1 with the low-reflection film of the embodiment will be described.

(Transparent Base)

The transparent base 2 is not particularly limited as long as it is made of a transparent material where supplying of the low reflective property by the low-reflection film 4 is generally required. For example, the transparent base 2 made of a glass, a resin, or a combination thereof (a composite material, a stacked material, or the like) is favorably used. Further, a form of the transparent base 2 is also not particularly limited, and, for example, it may be a plate form having rigidity, a film form having flexibility, or the like.

As a resin substrate used as the transparent base 2, there can be cited, for example, an acryl-based resin substrate of polymethyl methacrylate or the like, an aromatic polycarbonate-based resin substrate of carbonate of bisphenol A or the like, an aromatic polyester-based resin substrate of polyethylene terephthalate, or the like.

As a polymer film (the transparent base 2 of film form), there can be cited, for example, a polyester-based film of polyethylene terephthalate or the like, a polyolefin-based film of polypropylene or the like, a polyvinyl chloride film, an acrylic resin-based film, a polyethersulfone film, a polyarylate film, a polycarbonate film, or the like.

As a glass substrate used for the transparent base 2, there can be cited, for example, a substrate made of a general glass whose main component is a silicon dioxide, and a glass such as a soda-lime silicate glass, an aluminosilicate glass, a borosilicate glass, a non-alkali glass, or a quartz glass.

When a glass substrate is used as the transparent base 2, a composition of the glass is preferably a composition where molding and chemical tempering can be performed, and preferably contains sodium.

The composition of the glass is not particularly limited, and glasses having various compositions can be used. For example, there can be cited aluminosilicate glasses having the following compositions by mol % on the oxide basis:

(i) A glass containing $SiO_2$ of not less than 50% nor more than 80%, $Al_2O_3$ of not less than 2% nor more than 25%, $Li_2O$ of not less than 0% nor more than 10%, $Na_2O$ of not less than 0% nor more than 18%, $K_2O$ of not less than 0% nor more than 10%, MgO of not less than 0% nor more than 15%, CaO of not less than 0% nor more than 5%, and $ZrO_2$ of not less than 0% nor more than 5%;

(ii) A glass containing $SiO_2$ of not less than 50% nor more than 74%, $Al_2O_3$ of not less than 1% nor more than 10%, $Na_2O$ of not less than 6% nor more than 14%, $K_2O$ of not less than 3% nor more than 11%, MgO of not less than 2% nor more than 15%, CaO of not less than 0% nor more than 6%, and $ZrO_2$ of not less than 0% nor more than 5%, in which a sum of contents of $SiO_2$ and $Al_2O_3$ is 75% or less, a sum of contents of $Na_2O$ and $K_2O$ is not less than 12% nor more than 25%, and a sum of contents of MgO and CaO is not less than 7% nor more than 15%;

(iii) A glass containing $SiO_2$ of not less than 68% nor more than 80%, $Al_2O_3$ of not less than 4% nor more than 10%, $Na_2O$ of not less than 5% nor more than 15%, $K_2O$ of not less than 0% nor more than 1%, MgO of not less than 4% nor more than 15%, and $ZrO_2$ of not less than 0% nor more than 1%; and (iv) A glass containing $SiO_2$ of not less than 67% nor more than 75%, $Al_2O_3$ of not less than 0% nor more than 4%, $Na_2O$ of not less than 7% nor more than 15%, $K_2O$ of not less than 1% nor more than 9%, MgO of not less than 6% nor more than 14%, and $ZrO_2$ of not less than 0% nor more than 1.5%, in which a sum of contents of $SiO_2$ and $Al_2O_3$ is not less than 71% nor more than 75%, a sum of contents of $Na_2O$ and $K_2O$ is not less than 12% nor more than 20%, and when CaO is contained, a content of CaO is less than 1%.

The glass substrate is preferable as the transparent base 2.

A manufacturing method of the glass substrate is not particularly limited. The glass substrate can be manufactured in a manner that desired glass raw materials are put into a melting furnace, heated and melted at not less than 1500 degrees centigrade nor more than 1600 degrees centigrade, subjected to fining, and then supplied to a molding apparatus to mold the molten glass into a plate form, and the resultant is subjected to slow cooling. Note that a molding method of the glass substrate is not particularly limited, and, for example, there can be used a down-draw method (for example, an overflow down-draw method, a slot down method, a redraw method, or the like), a float method, a roll-out method, a pressing method, or the like.

When the glass substrate is used as the transparent base 2, in order to increase the strength of the base 1 with the low-reflection film to be obtained, it is preferable to perform chemical tempering on a principal surface of the glass substrate (for example, a principal surface after being subjected to antiglare treatment to be described later).

A method of the chemical tempering is not particularly limited, and the principal surface of the glass substrate is subjected to ion exchange to form a surface layer where a compressive stress remains on the glass substrate. Specifically, an alkali metal ion whose ion radius is small (for example, Li ions, Na ions) contained in the glass in the vicinity of the principal surface of the glass substrate are exchanged into the alkali metal ion whose ion radius is larger (for example, Na ions or K ions relative to Li ions, and K ions relative to Na ions) at a temperature equal to or lower than a glass transition point. Consequently, the compressive stress remains at the principal surface of the glass substrate, and the strength of the glass substrate is improved.

The glass substrate as the transparent base 2 preferably satisfies the following conditions. It is possible to make the glass substrate satisfy such conditions by performing the above-described chemical tempering.

Specifically, a surface compressive stress (referred to as CS, hereinafter) of the glass substrate is preferably not less than 400 MPa nor more than 1200 MPa, and more preferably not less than 700 MPa nor more than 900 MPa. The CS of 400 MPa or more is sufficient as practical strength. Further, when the CS is 1200 MPa or less, the substrate can endure its compressive stress, and there is no concern regarding natural occurrence of breakage. When the base 1 with the low-reflection film of the present invention is used as a front substrate (cover glass) of a display device, the CS of the glass substrate is particularly preferably not less than 700 MPa nor more than 850 MPa.

Further, a depth of a stress layer (referred to as DOL, hereinafter) of the glass substrate is preferably not less than 15 μm nor more than 50 μm, and more preferably not less than 20 μm nor more than 40 μm. When the DOL is 15 μm or more, even a sharp tool such as a glass cutter is used, there is no concern regarding that the glass substrate is easily damaged to be broken. Further, when the DOL is 50 μm or less, the substrate can endure its compressive stress, and there is no concern regarding natural occurrence of breakage. When the base 1 with the low-reflection film of the present invention is used as a front substrate (cover glass) of a display device or the like, the DOL of the glass substrate is particularly preferably not less than 25 μm nor more than 35 μm.

Thickness of the transparent base 2 can be appropriately selected according to the purpose. For example, in a case of the transparent base 2 of plate form such as a resin substrate or a glass substrate, the thickness of the transparent base 2 is preferably not less than 0.1 mm nor more than 5 mm, and more preferably not less than 0.2 mm nor more than 2 mm. When the transparent base 2 has a film form such as a polymer film, the thickness thereof is preferably not less than 50 μm nor more than 200 μm, and more preferably not less than 75 μm nor more than 150 μm. When a glass substrate is used as the transparent base 2, and the aforementioned chemical tempering is performed, a thickness of the glass substrate is normally preferably 5 mm or less, and more preferably 3 mm or less, in order to effectively perform the chemical tempering.

Further, when the transparent base 2 is a glass substrate, the size thereof can be appropriately selected according to the purposes. It is preferable that, when the transparent base 2 is used as a cover glass of a mobile device, the size thereof is 30 mm×50 mm to 300 mm×400 mm, and the thickness thereof is not less than 0.1 mm nor more than 2.5 mm, and when the transparent base 2 is used as a cover glass of a display device, the size thereof is 50 mm×100 mm to 2000 mm×1500 mm, and the thickness thereof is not less than 0.5 mm nor more than 4 mm.

(Antiglare Treatment)

In order to supply the antiglare property to the base 1 with the low-reflection film, the transparent base 2 preferably has a projecting and recessed shape on its principal surface. Note that the principal surface having the projecting and recessed shape is at least one principal surface of the transparent base 2, and at least the first principal surface being a surface on a side provided with the low-reflection film 4 is preferably set to a surface having the projecting and recessed shape.

As a method of forming the projecting and recessed shape on the principal surface of the transparent base 2, a publicly-known method can be applied, and antiglare treatment can be applied, for example. As the antiglare treatment, a publicly-known method can be used, and, for example, when a glass substrate is used as the transparent base 2, it is possible to use a method in which surface treatment is performed chemically or physically on the principal surface of the glass substrate to form a projecting and recessed shape with desired surface roughness, wet coating, or the like.

As a method of chemically performing the antiglare treatment, specifically, there can be cited a method of performing frost treatment, for example. The frost treatment can be performed by, for example, immersing the glass substrate being a treatment object into a mixed solution of hydrogen fluoride and ammonium fluoride.

Further, as a method of physically performing the antiglare treatment, it is possible to use, for example, what is called a sand-blast process in which a crystalline silicon dioxide powder, a silicon carbide powder, and so on are blasted to the principal surface of the glass substrate by using pressurized air, a method in which a brush having the crystalline silicon dioxide powder, the silicon carbide powder, and so on adhered thereto is moistened with water, and the principal surface of the glass substrate is polished by using the brush, and so on.

Among them, the frost treatment is preferable as a method of performing the antiglare treatment on the glass substrate because microcracks at the surface of the treatment object are hard to occur, and the reduction in the mechanical strength is hard to occur.

It is preferable that, on the principal surface of the glass substrate after being subjected to the antiglare treatment in a chemical or physical manner as described above, an etching process is performed to regulate the surface shape. As the etching process, for example, there can be used a method in which the glass substrate is immersed in an etching solution being an aqueous solution of hydrogen fluoride to chemically perform the etching. The etching solution may also contain, other than hydrogen fluoride, acids such as a hydrochloric acid, a nitric acid, and a citric acid. When the etching solution contains these acids, it is possible to suppress a local generation of precipitates due to a reaction between cations such as Na ions and K ions contained in the glass substrate and hydrogen fluoride, and in addition to that, the etching can be uniformly proceeded in a treatment surface of the treatment object.

When the etching process is performed, an etching amount is adjusted by adjusting a concentration of the etching solution, an immersion time of the glass substrate in the etching solution, and the like, and accordingly, a haze value of an antiglare treatment surface of the glass substrate can be adjusted to a desired value. Further, when the antiglare treatment is performed by the physical surface treatment such as the sandblasting, cracks may occur, but, such cracks can be removed by the etching process. Further, it is also possible to obtain an effect such that sparkle of the base 1 with the low-reflection film can be suppressed by the etching process.

The principal surface of the glass substrate after being subjected to the antiglare treatment and the etching process in a manner as described above, in other words, the surface of the projecting and recessed shape preferably has a surface roughness (root mean square roughness, RMS) of not less than 0.01 μm nor more than 0.5 μm. The surface roughness (RMS) is more preferably not less than 0.01 μm nor more than 0.3 μm, and still more preferably not less than 0.01 μm nor more than 0.2 μm. By setting the surface roughness (RMS) of the principal surface of the glass substrate to fall within the above-described range, it is possible to adjust a haze value of the glass substrate after being subjected to the antiglare treatment to not less than 1% nor more than 30%, and as a result of this, it is possible to supply excellent antiglare property to the base 1 with the low-reflection film to be obtained. Note that the haze value is a value defined by JIS K 7136.

The surface roughness (RMS) can be measured based on a method defined by JIS B 0601: (2001). Specifically, a laser microscope (product name: VK-9700, manufactured by KEYENCE CORPORATION) is used to set a visual field range of 300 μm×200 μm with respect to a measurement surface of the glass substrate after being subjected to the antiglare treatment, being a sample, and height information of the glass substrate is measured. A cut-off correction is performed with respect to the measurement value, and by determining a mean square of the obtained heights, it is possible to calculate the surface roughness (RMS). It is preferable to use 0.08 mm as the cut-off value.

Further, it is preferable to set such that the principal surface of the glass substrate after being subjected to the antiglare treatment, in other words, the surface of the projecting and recessed shape has RSm being an average length of a roughness curve element of not less than 5 μm nor more than 30 μm. Here, the average length RSm of the roughness curve element is a length obtained in a manner that, in a roughness curve included in a reference length taken on a reference plane, lengths on the reference plane in which projections and recesses corresponding to one cycle are generated, are averaged. The average length RSm of the roughness curve element can be measured by a method based on the method defined by JIS B 0601 (2001).

According to the studies conducted by the present inventors, it is preferable that the surface roughness RMS falls within the above-described range, and the average length RSm of the roughness curve element is not less than 5 μm nor more than 30 μm, since it is possible to suppress the sparkle of the base 1 with the low-reflection film more effectively and it is also possible to suppress the visibility of printing unevenness of the black printed part 6.

The surface of the glass substrate after being subjected to the antiglare treatment and the etching process has the projecting and recessed shape, and when the projecting and recessed shape is observed from above the surface of the glass substrate, it seems to be circular pores. A size (diameter) of each circular pore observed as above is preferably not less than 1 μm nor more than 10 μm. When the size of the pore falls within this range, it is possible to realize both of the prevention of sparkle and the antiglare property of the base 1 with the low-reflection film.

Note that under a normal use environment, lights are incident from various angles on the base 1 with the low-reflection film. The evaluation of the visibility of the printing unevenness of the black printed part 6 is also conducted under such conditions. It has been found out that the visibility of the printing unevenness under the normal use environment is correlated with the luminous reflectance measured by the SCI mode described above. Further, this luminous reflectance does not change depending on the presence/absence of the antiglare treatment with respect to the transparent base 2. Therefore, it can be considered that the visibility of the printing unevenness of the black printed part 6 is not influenced by the presence/absence of the antiglare treatment with respect to the transparent base 2.

(Low-Reflection Film)

In the base 1 with the low-reflection film of the present invention, the low-reflection film 4 is formed on the first principal surface 3 of the transparent base 2. When the aforementioned antiglare treatment is performed on the transparent base 2, it is preferable that the low-reflection film 4 is formed on the principal surface after being subjected to the antiglare treatment.

A configuration of the low-reflection film 4 is not particularly limited as long as it is a configuration capable of suppressing the reflection of light to fall within a predetermined range, and, for example, the low-reflection film 4 can be configured by stacking a high-refractive index layer and a low-refractive index layer. Here, the high-refractive index layer indicates a layer whose refractive index for light with a wavelength of 550 nm is 1.9 or more, and the low-refractive index layer indicates a layer whose refractive index for light with a wavelength of 550 nm is 1.6 or less, for example.

Regarding the number of layers of the high-refractive index layer and the low-refractive index layer in the low-reflection film 4, it is possible to employ a mode in which one layer of the high-refractive index layer and one layer of the low-refractive index layer are included, and, alternatively, it is also possible to employ a configuration in which two layers or more of the high-refractive index layers and two layers or more of the low-refractive index layers are included. When the configuration in which one layer of the high-refractive index layer and one layer of the low-refractive index layer are included is employed, it is preferably one in which the high-refractive index layer and the low-refractive index layer are stacked, in this order, on the principal surface of the transparent base 2. Further, when the configuration in which two layers or more of the high-refractive index layers and two layers or more of the low-refractive index layers are included is employed, it is preferably a mode in which the high-refractive index layers and the low-refractive index layers are alternately stacked in this order.

In order to improve the low reflective property, the low-reflection film 4 is preferably a stack formed by stacking a plurality of layers, and, for example, the stack is preferably one formed by stacking layers of not less than two layers nor more than eight layers in total, it is more preferably one formed by stacking layers of not less than two layers nor more than six layers, and it is still more preferably one formed by stacking layers of not less than two layers nor more than four layers. The stack described here is preferably one formed by alternately stacking the high-refractive index layers and the low-refractive index layers as described above, and a sum of the number of layers of the high-refractive index layers and the low-refractive index layers is preferably within the above-described range. Further, it is also possible to add a film within a range not impairing the optical characteristics. For example, it is also possible to insert an $SiO_2$ film between the glass and the first layer forming the low-reflection film 4, in order to prevent diffusion of Na from the glass base.

In order to control the luminous reflectance $R_1$ of the low-reflection film 4 to a desired range, and to control the luminous reflectance R of the base 1 with the low-reflection film measured with respect to the incident light from the low-reflection film 4 side in the region having the black printed part 6 to 2% or less, it is preferable that a layer thickness of the high-refractive index layer and a layer thickness of the low-refractive index layer of the low-reflection film 4 are appropriately adjusted.

Materials which compose the high-refractive index layer and the low-refractive index layer are not particularly limited, and they can be selected in consideration of a degree of required low reflective property, productivity, and so on. As the material composing the high-refractive index layer, there can be cited, for example, a niobium oxide ($Nb_2O_5$), a titanium oxide ($TiO_2$), a zirconium oxide ($ZrO_2$), a tantalum oxide ($Ta_2O_5$), an aluminum oxide ($Al_2O_3$), a silicon nitride (SiN), and the like. It is possible to favorably use one kind or more of materials selected from these materials. As the material composing the low-refractive index layer, there can be cited a silicon oxide (particularly, silicon dioxide $SiO_2$), a material containing a mixed oxide of Si and Sn, a material containing a mixed oxide of Si and Zr, a material containing a mixed oxide of Si and Al, and the like. It is possible to favorably use one kind or more of materials selected from those materials.

From viewpoints of the productivity and the refractive index, it is preferable to employ a configuration in which the high-refractive index layer is a layer made of one kind of material selected from the niobium oxide, the tantalum oxide, and the silicon nitride, and the low-refractive index layer is a layer made of the silicon oxide.

A method of performing film-forming of each layer composing the low-reflection film 4 is not particularly limited, and various film-forming methods can be used. For example, there can be used a vacuum deposition method, an ion beam assisted vapor deposition method, an ion plating method, a sputtering method, a plasma CVD method, and so on. Among these film-forming methods, the sputtering method is preferably used because it is possible to form a dense film with high durability. In particular, it is preferable to perform film-forming by the sputtering method such as a pulse sputtering method, an AC sputtering method, or a digital sputtering method.

For example, when the film-forming is performed by the pulse sputtering method, the transparent base 2 such as the glass substrate is disposed in a chamber in a mixed gas atmosphere of inert gas and oxygen gas, and a target is selected to be film-formed so as to realize a desired composition. At this time, the kind of gas of the inert gas in the chamber is not particularly limited, and there can be used various inert gases such as argon and helium.

Further, the pressure in the chamber by the mixed gas of the inert gas and the oxygen gas is not particularly limited, but, when it is set to fall within a range of 0.5 Pa or less, it becomes easy to set a surface roughness of the film to be formed to fall within a preferable range. It can be considered that this is because of the reasons to be described below. Namely, when the pressure in the chamber by the mixed gas of the inert gas and the oxygen gas is 0.5 Pa or less, a mean free path of film-forming molecules is secured, and the film-forming molecules reach the transparent base 2 with more energy. Accordingly, it can be considered that reallocation of the film-forming molecules is accelerated, resulting in that a film having a relatively dense and smooth surface is formed. A lower limit value of the pressure in the chamber by the mixed gas of the inert gas and the oxygen gas is not particularly limited, but, for example, it is preferably 0.1 Pa or more.

When the high-refractive index layer and the low-refractive index layer are film-formed by the pulse sputtering method, it is possible to adjust the layer thickness of each layer by, for example, adjustment of discharge power, adjustment of the film-forming time, and so on.

(Antifouling Film)

It is preferable that the base 1 with the low-reflection film of the present invention further includes an antifouling film formed on the low-reflection film 4. As a film-forming method of the antifouling film, it is possible to use either a dry method such as the vacuum deposition method, the ion beam assisted vapor deposition method, the ion plating method, the sputtering method, or the plasma CVD method, or a wet method such as a spin coating method, a dip coating method, a casting method, a slit coating method, or a spray method. From a viewpoint of scratch resistance, it is preferable to use the dry film-forming method.

A composing material of the antifouling film can be appropriately selected from materials capable of supplying an antifouling property, water repellency, and oil repellency. Specifically, there can be cited a fluorine-containing organosilicon compound. The fluorine-containing organosilicon compound can be used without being limited in particular as long as it supplies the antifouling property, the water repellency, and the oil repellency.

As the fluorine-containing organosilicon compound, for example, it is possible to favorably use an organosilicon compound having one or more of groups selected from a group consisting of a polyfluoropolyether group, a polyfluoroalkylene group, and a polyfluoroalkyl group. Note that the polyfluoropolyether group indicates a bivalent group having a structure in which a polyfluoroalkylene group and an ether oxygen atom are alternately bonded.

As a commercially available product of the fluorine-containing organosilicon compound having one or more of groups selected from the group consisting of the polyfluoropolyether group, the polyfluoroalkylene group, and the polyfluoroalkyl group, it is possible to favorably use KP-801, KY178, KY-130, and KY185 (each being a product name, manufactured by Shin-Etsu Chemical Co., Ltd.), OPTOOL DSX and OPTOOL AES (each being a product name, manufactured by DAIKIN Industries, Ltd.), and so on.

Note that the fluorine-containing organosilicon compound is generally preserved by being mixed with a solvent of fluorine base or the like, for the purpose of suppression of deterioration due to a reaction with a moisture in the atmosphere, and the like, and if it is subjected to a film-forming process while it contains these solvents, there is a possibility that an adverse effect is exerted on durability and the like of an obtained thin film. For this reason, when the antifouling film is film-formed by the vacuum deposition method in accordance with a procedure to be described later, it is preferable to use a fluorine-containing organosilicon compound on which solvent removal processing is performed in advance before performing heating with a heating container.

Here, as a solvent used for preserving the above-described fluorine-containing organosilicon compound, for example, there can be cited fluorine-based solvents such as polyfluorohexane, methaxylene hexafluoride ($C_6H_4(CF_3)_2$), hydrofluoropolyether, and HFE7200/7100 (product name, manufactured by Sumitomo 3M Ltd., in which HFE7200 is represented by Formula: $C_4F_9C_2H_5$, and HFE7100 is represented by Formula: $C_4F_9CH_3$). For example, a concentration of the solvent contained in the solution of the fluorine-containing organosilicon compound is preferably 1 mol % or less, and more preferably 0.2 mol % or less. It is particularly preferable to use the fluorine-containing organosilicon compound containing no solvent.

The removal processing of the fluorine-based solvent from the fluorine-containing organosilicon compound solution containing the fluorine-based solvent described above can be carried out by, for example, performing evacuation on a container containing the solution of the fluorine-containing organosilicon compound. The period of time of performing the evacuation is not limited since it may be changed due to the exhaust line, the exhaust performance of the vacuum pump and the like, the amount of solution, and the like, but, it is only required to perform evacuation for 10 hours or more, for example.

When the antifouling film made of the above-described fluorine-containing organosilicon compound is formed, it is preferable to use a vacuum deposition method for the film-forming. When the vacuum deposition method is used, the removal processing of the solvent described above can also be performed in a manner that the fluorine-containing organosilicon compound solution is introduced into a heating container of a film-forming apparatus which performs film-forming of the antifouling film, and then, before the temperature is raised, evacuation in the heating container is performed at room temperature. Further, it is also possible to perform the solvent removal by using an evaporator or the like in advance, before the solution is introduced into the heating container.

Note that the fluorine-containing organosilicon compound having a small content of the solvent or containing no solvent is easily deteriorated by being brought into contact with the atmosphere, when compared to the fluorine-containing organosilicon compound containing the solvent. Accordingly, regarding a keeping container of the fluorine-containing organosilicon compound having a small content of the solvent (or containing no solvent), it is preferable to use one in which the inside of the container is replaced with inert gas of nitrogen or the like and sealed, and when handling the keeping container, it is preferable to reduce an exposure time to the atmosphere.

Specifically, when the keeping container is opened, it is preferable to immediately introduce the fluorine-containing organosilicon compound into the heating container of the film-forming apparatus which performs film-forming of the antifouling film. Further, after the introduction, it is preferable to set the inside of the heating container to be vacuum or replace the inside of the heating container with inert gas of nitrogen, rare gas, or the like, to thereby remove the atmosphere (air) contained in the heating container. In order to realize that the fluorine-containing organosilicon compound can be introduced into the heating container of the film-forming apparatus from the keeping container (storage container) without being brought into contact with the atmosphere, the keeping container and the heating container are more preferably connected by a pipe with a valve, for example.

Further, after the fluorine-containing organosilicon compound is introduced into the heating container and then the inside of the container is set to be vacuum or replaced with the inert gas, it is preferable to immediately start heating for the film-forming.

In the present invention, the film thickness of the antifouling film formed on the low-reflection film 4 is not particularly limited, but, it is preferably not less than 2 nm nor more than 20 nm, more preferably not less than 2 nm nor more than 15 nm, and still more preferably not less than 2 nm nor more than 10 nm. When the film thickness of the antifouling film is 2 nm or more, a state where the surface of the low-reflection film 4 is uniformly covered by the antifouling film is created, resulting in that it is possible to withstand practical use from a viewpoint of scratch resistance. Besides, when the film thickness of the antifouling film is 20 nm or less, optical characteristics such as the haze value of the transparent base 2 in a state where the antifouling film is stacked thereon are fine.

(Black Printed Part)

The base 1 with the low-reflection film of the present invention is provided with the black printed part 6 on a part of the second principal surface 5 of the transparent base 2. The black printed part 6 may be a light shielding part which shields a part that comes in sight to be an obstruction when seeing a display, such as wiring circuits disposed in an outer peripheral part of a display panel, to thereby enhance visibility of display and a beautiful appearance, or it may also be a printed part of a character, a pattern, or the like.

The aforementioned black printed part 6 is formed by a method of printing a black ink. As a printing method, there are a bar coating method, a reverse coating method, a gravure coating method, a die coating method, a roll coating method, a screen method, and so on. The screen printing method is preferable because printing can be performed easily, printing on various base materials is possible, and further, it is possible to perform printing in accordance with the size of the transparent base 2.

The black ink can be used without being limited in particular. As the black ink, there can be used an inorganic ink containing a ceramic fired body or the like, or an organic ink containing a color material such as dye or pigment and an organic resin.

As the ceramics contained in the black inorganic ink, there are an oxide such as a chromium oxide or an iron oxide, a carbide such as a chromium carbide or a tungsten carbide, carbon black, mica, and so on. The black printed part 6 is obtained in a manner that an ink made of the ceramics and silica is melted, printed in a desired pattern, and then subjected to firing. This inorganic ink requires melting and firing processes, and in general, it is used as a glass dedicated ink.

The organic ink is a composition containing a black dye or pigment and the organic resin. As the organic resin, there can be cited an epoxy-based resin, an acryl-based resin, polyethylene terephthalate, polyethersulfone, polyarylate, polycarbonate, a transparent ABS resin, a phenol resin, an acrylonitrile-butadiene-styrene resin, a homopolymer such as polyurethane, polymethyl methacrylate, polyvinyl, polyvinylbutyral, polyetheretherketone, polyethylene, polyester, polypropylene, polyamide, or polyimide, and a resin made of a copolymer between a monomer of these resins and a monomer capable of being copolymerized with the monomer. Further, the dye or pigment can be used without being limited in particular, as long as it is a black one.

Between the inorganic ink and the organic ink, usage of the organic ink is preferable because the firing temperature thereof is low. Besides, the organic ink containing pigment is preferable from a viewpoint of chemical resistance.

Here, the printing of black color indicates that the luminous reflectance $R_2$ calculated by the aforementioned method regarding the black printed part 6 is 1% or less, preferably 0.8% or less, and more preferably 0.6% or less, and a value of chromaticity (a*b*) defined by ITS Z 8781-4: 2013 measured under a light source of D65 is (0±2, 0±2). The value of chromaticity (a*b*) of the black printed part 6 is preferably (0±1.5, 0±1.5), and more preferably (0±1, 0±1).

The base with the low-reflection film of the present invention has the low-reflection film whose luminous reflectance is adjusted, so that it is hard to visually recognize the printing unevenness of the black printed part provided for the purpose of light shielding and the like of the outer peripheral part. For this reason, when the base with the low-reflection film of the present invention is used as a front substrate such as a cover glass of a display device, it is possible to improve visibility of display, and besides, it is possible to supply a good design and a beautiful appearance.

EXAMPLES

Hereinafter, the present invention will be described in detail by using examples. Note that the present invention is not limited to them.

In the following description, a processing procedure of a glass substrate will be described first. In each of examples and comparative example, Dragontrail (product name, manufactured by Asahi Glass Co., Ltd., thickness of 1.3 mm, also referred to as "DT," hereinafter) being a glass substrate for chemical tempering was used as a glass substrate.

(1) Antiglare Treatment

An acid-resistant protective film was bonded to one principal surface of the DT, and then the DT was immersed in a 3 mass % hydrogen fluoride solution for three minutes to be etched, thereby removing fouling adhered to the surface of the DT. Next, the glass substrate after the fouling thereof was removed was immersed in a mixed solution of 15 mass % hydrogen fluoride and 15 mass % potassium fluoride for three minutes to be subjected to the frost treatment, and then immersed in a 10 mass % hydrogen fluoride solution for six minutes, to thereby adjust the haze value. Next, the acid-resistant protective film was peeled off, thereby obtaining a glass substrate in which the antiglare treatment was performed on the principal surface of one side.

Note that the haze value of the DT was measured by using a haze meter (product name: HZ-V3, manufactured by Suga Test Instruments Co., Ltd.), based on JIS K 7136.

(2) Chemical Tempering

The glass substrate after being subjected to the antiglare treatment, or the DT in the case of performing no antiglare treatment, was cut into a size of 250 mm×150 mm, and thereafter, chemical tempering was performed as will be described below.

Specifically, the glass substrate or the DT was immersed for two hours in potassium nitrate (molten salt) which was heated to 450 degrees centigrade to be melted, and after that, the glass substrate or the DT was pulled up from the molten salt, and subjected to slow cooling to room temperature in one hour. Consequently, there was obtained a chemically-tempered glass substrate whose surface compressive stress (CS) was 730 MPa, and whose depth of the stress layer (DOL) was 30 μm.

(3) Formation of Black Printed Part

In the glass substrate after being subjected to the chemical tempering, a black printed part in an outer frame state was formed, by screen printing, on an outer peripheral part of the principal surface on which no antiglare treatment was performed. Note that in the glass substrate on which no antiglare treatment was performed, the black printed part in an outer frame state was formed on either of principal surfaces.

Note that it is also possible that the black printed part was formed after the glass substrate after being subjected to the chemical tempering was subjected to treatment in which it was immersed in an alkaline solution (product name: Sunwash TL-75, manufactured by Lion Corporation) for four hours (also referred to as alkali treatment, hereinafter).

Specifically, printing was performed in a black frame state with a width of 2 cm at all sides of an outer peripheral part of the principal surface of the glass substrate, in accordance with the following procedure, to thereby form the black printed part. At first, a black ink was coated with a thickness of 5 μm by a screen printer, and it was held at 150 degrees centigrade for 10 minutes to be dried, to thereby form a first printed layer. Next, after a black ink was coated with a thickness of 5 μm on the first printed layer according to the same procedure as above, it was held at 150 degrees centigrade for 40 minutes to be dried, to thereby form a second printed layer. In a manner as described above, the black printed part in which the first printed layer and the second printed layer were stacked was formed, and the glass substrate provided with the black printed part at an outer peripheral part of one principal surface was obtained.

The kind of the black ink used in each of examples and comparative example will be described in explanation regarding each example to be described later and TABLE 1.

(4) Formation of Low-Reflection Film

On the entire surface of the surface (first principal surface) of the glass substrate on which the black printed part was not formed, a low-reflection film having a structure in which high-refractive index layers and low-refractive index layers were alternately stacked was formed.

Note that when the low-reflection film is formed in a manner as described above on the substrate on which the alkali treatment and the formation of the black printed part are performed in order after the chemical tempering, it is possible to realize not only reduction in reflectance but also suppression of a distribution of color shade.

Hereinafter, a formation method of a high-refractive index layer made of niobium oxide ($Nb_2O_5$), a formation method of a high-refractive index layer made of silicon nitride (SiN), and a formation method of a low-refractive index layer made of silicon oxide ($SiO_2$) will be respectively described.

(A) Formation of High-Refractive Index Layer Made of Niobium Oxide

In a vacuum chamber, the pulse sputtering was performed under conditions of a pressure of 0.3 Pa, a frequency of 20 kHz, a power density of 3.8 W/cm$^2$, and a reverse pulse width of 5 μsec by using a niobium oxide target (product name: NBO target, manufactured by AGC Ceramics Co., Ltd.) while introducing mixed gas in which oxygen gas was mixed to be 10 volume % to argon gas, to thereby form a high-refractive index layer made of a niobium oxide on the entire surface of the surface of the glass substrate on which the high-refractive index layer was to be formed.

(B) Formation of High-Refractive Index Layer Made of Silicon Nitride

In a vacuum chamber, the pulse sputtering was performed under conditions of a pressure of 0.3 Pa, a frequency of 20 kHz, a power density of 3.8 W/cm$^2$, and a reverse pulse width of 5 μsec by using a silicon target while introducing mixed gas in which nitrogen gas was mixed to argon gas to be the mixed gas containing 50 volume % nitrogen gas, to thereby form a high-refractive index layer made of a silicon nitride on the entire surface of the surface of the glass substrate on which the high-refractive index layer was to be formed.

(C) Formation of Low-Refractive Index Layer Made of Silicon Oxide

In a vacuum chamber, the pulse sputtering was performed under conditions of a pressure of 0.3 Pa, a frequency of 20 kHz, a power density of 3.8 W/cm$^2$, and a reverse pulse width of 5 μsec by using a silicon target while introducing mixed gas in which oxygen gas was mixed to argon gas to be the mixed gas containing 40 volume % oxygen gas, to thereby form a low-refractive index layer made of a silicon oxide on the entire surface of the surface on which the low-refractive index layer was to be formed.

In examples and comparative example, the formation of the high-refractive index layer of the above-described (A) or (B), and the formation of the low-refractive index layer of (C) were alternately conducted in such an order that formation (A) or (B) was first conducted and then formation (C) was conducted, to thereby alternately stack the high-refractive index layers and the low-refractive index layers to form the low-reflection film.

A configuration (a composing material and a thickness of each layer) of the low-reflection film in each of examples and comparative example is described in explanation of each example to be described later and TABLE 1. Note that in TABLE 1, the niobium oxide ($Nb_2O_5$) is indicated as NBO.

(5) Formation of Antifouling Film

On the low-reflection film formed on the glass substrate, an antifouling film was formed by the following procedure.

First, a formation material of a fluorine-containing organosilicon compound film was introduced into a heating container as a material of the antifouling film. After that, deaeration in the heating container was performed for 10 hours or more by a vacuum pump to remove solvent in the solution to make a formation composition of the fluorine-containing organosilicon compound film (hereinafter, referred to as an antifouling film forming composition).

Next, the heating container accommodating the antifouling film forming composition was heated to 270 degrees centigrade, and after the temperature reached 270 degrees centigrade, the state was kept for 10 minutes until the temperature was stabilized. Next, after the glass substrate on which the low-reflection film was formed was placed in the vacuum chamber, the antifouling film forming composition was supplied from a nozzle connected to the heating container accommodating the antifouling film forming composition toward the low-reflection film of the glass substrate, to thereby perform the film-forming.

The film-forming was performed while measuring a film thickness by a quartz resonator monitor placed in the vacuum chamber, and continued until the film thickness of the fluorine-containing organosilicon compound film on the low-reflection film became 4 nm. Next, the glass substrate taken out of the vacuum chamber was placed on a hot plate in a manner that the fluorine-containing organosilicon compound film surface faced upward, and heat treatment was performed in the atmosphere at 150 degrees centigrade for 60 minutes.

In a manner as described above, the antifouling film was formed on the entire surface on the low-reflection film of the glass substrate.

A kind of formation material of the fluorine-containing organosilicon compound film used in each of examples and comparative example is described later in explanation of each example and TABLE 1.

In the following examples and comparative example, specifically used materials and combinations of procedures will be mainly described. Example 1 to Example 5 are examples of the present invention, and Example 6 is comparative example.

Example 1

On the DT, the chemical tempering (Step 2) was performed without performing the antiglare treatment (Step 1). Next, GLSHF (product name, manufactured by Teikoku Printing Inks Mfg. Co., Ltd.) was used as a black ink to perform the formation of the black printed part (Step 3). Next, the formation of the high-refractive index layer made of the niobium oxide (Step A) and the formation of the low-refractive index layer made of the silicon oxide (Step C) were alternately performed so that the stacking number became four, to thereby perform the formation of the low-reflection film (Step 4). Regarding a layer thickness of each layer, the niobium oxide layer of the first layer was set to have 13 nm, the silicon oxide layer of the second layer was set to have 35 nm, the niobium oxide layer of the third layer was set to have 120 nm, and the silicon oxide layer of the fourth layer was set to have 85 nm. After that, the formation of the antifouling film was not conducted (Step 5). In a manner as described above, the base with the low-reflection film was obtained.

Example 2

On the DT, the antiglare treatment was performed (Step 1) to adjust the haze value to 25%, and then (Step 2) the chemical tempering was performed. Next, the formation of the black printed part was performed (Step 3) in a similar manner to Example 1. Next, the formation of the low-reflection film (Step 4) was performed. Regarding a layer thickness of each layer, the niobium oxide layer of the first layer was set to have 10 nm, the silicon oxide layer of the second layer was set to have 41 nm, the niobium oxide layer of the third layer was set to have 115 nm, and the silicon oxide layer of the fourth layer was set to have 90 nm.

Next, KY185 (product name, manufactured by Shin-etsu Chemical Co., Ltd.) was used as a formation material of the fluorine-containing organosilicon compound film, to perform the formation of the antifouling film (Step 5). In a manner as described above, the base with the low-reflection film was obtained.

Example 3

On the DT, the antiglare treatment (Step 1) was performed to adjust the haze value to 2%, and then the chemical tempering (Step 2) was performed. Next, the formation of the black printed part (Step 3) was performed by using HFGV3RX01 (product name, manufactured by Seiko Advance Ltd.) as a black ink. Next, the formation of the low-reflection film (Step 4) was performed. Regarding the layer thickness of each layer, the niobium oxide layer of the first layer was set to have 14 nm, the silicon oxide layer of the second layer was set to have 20 nm, the niobium oxide layer of the third layer was set to have 80 nm, and the silicon oxide layer of the fourth layer was set to have 80 nm. Next, OPTOOL (product name, manufactured by DAIKIN Industries, Ltd.) was used as a formation material of the fluorine-containing organosilicon compound film, to perform the formation of the antifouling film (Step 5). In a manner as described above, the base with the low-reflection film was obtained.

Example 4

On the DT, the chemical tempering (Step 2) was performed without performing the antiglare treatment (Step 1). Next, the formation of the black printed part (Step 3) was performed in a similar manner to Example 1. Next, the formation of the high-refractive index layer made of the silicon nitride (Step B) and the formation of the low-refractive index layer made of the silicon oxide (Step C) were alternately performed so that the stacking number became eight, to thereby perform the formation of the low-reflection film (Step 4). Regarding a layer thickness of each layer, the silicon nitride layer of the first layer was set to have 13 nm, the silicon oxide layer of the second layer was set to have 68 nm, the silicon nitride layer of the third layer was set to have 17 nm, the silicon oxide layer of the fourth layer was set to have 105 nm, the silicon nitride layer of the fifth layer was set to have 13 nm, the silicon oxide layer of the sixth layer was set to have 51 nm, the silicon nitride layer of the seventh layer was set to have 120 nm, and the silicon oxide layer of the eighth layer was set to have 80 nm. Next, KY178 (product name, manufactured by Shin-etsu Chemical Co., Ltd.) was used as a formation material of the fluorine-containing organosilicon compound film, to thereby perform the formation of the antifouling film (Step 5). In a manner as described above, the base with the low-reflection film was obtained.

Example 5

On the DT, the antiglare treatment (Step 1) was performed to adjust the haze value to 25%, and then the chemical tempering (Step 2) was perfoi med. Next, the formation of the black printed part (Step 3) was performed in a similar manner to Example 1, and then the formation of the high-refractive index layer made of the niobium oxide (Step A) and the formation of the low-refractive index layer made of the silicon oxide (Step C) were performed in order, to thereby perform the formation of the low-reflection film in which the stacking number became two (Step 4). Regarding a layer thickness of each layer, the niobium oxide layer of the first layer was set to have 13 nm, and the silicon oxide layer of the second layer was set to have 120 nm. Next, KY178 (product name, manufactured by Shin-etsu Chemical Co., Ltd.) was used as a formation material of the fluorine-containing organosilicon compound film, to thereby perform (5) the formation of the antifouling film. In a manner as described above, the base with the low-reflection film was obtained.

Example 6

On the DT, the chemical tempering (Step 2) was performed without performing the antiglare treatment (Step 1). Next, the formation of the black printed part (Step 3) was performed by using HFGV3RX01 (product name, manufactured by Seiko Advance Ltd.) as a black ink. Next, the formation of the high-refractive index layer made of the niobium oxide (Step A) and the formation of the low-refractive index layer made of the silicon oxide (Step C) were alternately performed so that the stacking number became four, to thereby perform the formation of the low-reflection film (Step 4). Regarding a layer thickness of each layer, the niobium oxide layer of the first layer was set to have 14 nm, the silicon oxide layer of the second layer was set to have 30 nm, the niobium oxide layer of the third layer was set to have 110 nm, and the silicon oxide layer of the fourth layer was set to have 90 nm. After that, the formation of the antifouling film (Step 5) was not conducted. In a manner as described above, the base with the low-reflection film was obtained.

The following evaluation was performed on the base with the low-reflection film obtained in each of Example 1 to Example 6. Results thereof are respectively shown in lower lines in TABLE 1.

(Luminous Reflectance)

A refractive index of a rear surface of the base with the low-reflection film, in a region having no black printed part, namely, on a side where the low-reflection film was not provided, was measured by using an ellipsometer (product name: M-2000, manufactured by J. A. Woollam Co., Inc.), to thereby calculate a reflectance $R_0$. Further, regarding the base with the low-reflection film, a reflectance was measured by a spectrophotometric colorimeter (product name: CM-2600d, manufactured by KONICA MINOLTA, INC.); and from the measured reflectance, a luminous reflectance $R_G$ and a luminous reflectance $R_{tot}$ (each being a stimulus value Y of reflection defined by JIS Z 8701: 1999) were determined. In a manner as described above, $R_1$ and $R_2$ were calculated in accordance with the aforementioned method. Note that the low-reflection film of each of Example 1 to Example 6 had absorption of substantially zero.

(Printing Unevenness)

The base with the low-reflection film was visually observed at various angles from the side having the low-reflection film, under a fluorescent light (1500 Lx). At this time, the base with the low-reflection film in which the unevenness due to dark and light of printing was recognized in the region having the black printed part at the outer peripheral part was evaluated as B, and the base with the low-reflection film in which the unevenness due to dark and light of printing was not recognized in the region having the black printed part at the outer peripheral part was evaluated as A.

(Contact Angle of Water)

A contact angle of water at an outermost surface on the low-reflection film side of the base with the low-reflection film was measured by a contact angle meter (manufactured by Kyowa Interface Science Co., Ltd., product name: PCA- 1). Specifically, on a surface of the antifouling film in the base with the low-reflection film provided with the antifouling film, or on a surface of the low-reflection film in the base with the low-reflection film provided with no antifouling film, 1 μL of pure water was dropped by using a dropper, and a contact angle of water was determined by a three-point method from image of the droplets.

TABLE 1

|  | Example 1 | Example 2 | Example 3 | Example 4 | Example 5 | Example 6 |
|---|---|---|---|---|---|---|
| Transparent base | DT | DT | DT | DT | DT | DT |
| Black ink | Manufactured by Teikoku Printing Inks Mfg. Co., Ltd. | Manufactured by Teikoku Printing Inks Mfg. Co., Ltd. | Manufactured by Seiko Advance Ltd. | Manufactured by Teikoku Printing Inks Mfg. Co., Ltd. | Manufactured by Teikoku Printing Inks Mfg. Co., Ltd. | Manufactured by Seiko Advance Ltd. |
| Antiglare treatment | Without | With | With | Without | With | Without |
| Haze value | — | 25% | 2% | — | 25% | — |
| Low-reflection film | Four layers NBO/SiO$_2$ | Four layers NBO/SiO$_2$ | Four layers NBO/SiO$_2$ | Eight layers SiN/SiO$_2$ | Two layers NBO/SiO$_2$ | Four layers NBO/SiO$_2$ |
| First layer | 13 nm Niobium oxide | 10 nm Niobium oxide | 14 nm Niobium oxide | 13 nm Silicon nitride | 13 nm Niobium oxide | 14 nm Niobium oxide |
| Second layer | 35 nm Silicon oxide | 41 nm Silicon oxide | 20 nm Silicon oxide | 68 nm Silicon oxide | 120 nm Silicon oxide | 30 nm Silicon oxide |
| Third layer | 120 nm Niobium oxide | 115 nm Niobium oxide | 80 nm Niobium oxide | 17 nm Silicon nitride | — | 110 nm Niobium oxide |
| Fourth layer | 85 nm Silicon oxide | 90 nm Silicon oxide | 80 nm Silicon oxide | 105 nm Silicon oxide | — | 90 nm Silicon oxide |
| Fifth layer | — | — | — | 13 nm Silicon nitride | — | — |
| Sixth layer | — | — | — | 51 nm Silicon oxide | — | — |
| Seventh layer | — | — | — | 120 nm Silicon nitride | — | — |
| Eighth layer | — | — | — | 80 nm Silicon oxide | — | — |
| Antifouling film | None | KY185 (manufactured by Shin-Etsu Chemical Co., Ltd.) | OPTOOL (manufactured by DAIKIN Industries, Ltd.) | KY178 (manufactured by Shin-Etsu Chemical Co., Ltd.) | KY178 (manufactured by Shin-Etsu Chemical Co., Ltd.) | None |
| Luminous reflectance $R_{tot}$ | 0.70% | 0.95% | 1.39% | 1.00% | 0.90% | 0.80% |
| $R_1$ | 0.30% | 0.35% | 1.00% | 0.40% | 0.30% | 0.10% |
| $R_2$ | 0.40% | 0.60% | 0.40% | 0.60% | 0.60% | 0.70% |
| $R_1/R_2$ | 0.75 | 0.58 | 2.50 | 0.67 | 0.50 | 0.14 |
| Printing unevenness | A | A | A | A | A | B |
| Contact angle of water | 20° | 110° | 109° | 112° | 112° | 20° |

From TABLE 1, in the base with the low-reflection film in each of Example 1 to Example 5 in which the luminous reflectance $R_{tot}$ was 2% or less and the value of $R_1/R_2$ was ⅙ or more, no printing unevenness of the black printed part was recognized. On the contrary, in the base with the low-reflection film in Example 6 in which the luminous reflectance $R_{tot}$ was 2% or less, but, the value of $R_1/R_2$ was less than ⅙, the printing unevenness of the black printed part was recognized.

INDUSTRIAL APPLICABILITY

In a base with a low-reflection film of the present invention, printing unevenness is hard to be visually recognized in a black printed part provided for the purpose of light shielding and the like. Therefore, the base with the low-reflection film of the present invention is suitable for a front substrate of a display device, and can supply not only good display visibility but also an excellent design and a beautiful appearance.

EXPLANATION OF REFERENCE NUMERALS

1: base with low-reflection film; 2: transparent base; 3: first principal surface; 4: low-reflection film; 5: second principal surface; 6: black printed part

What is claimed is:

1. A base with a low-reflection film, comprising:
   a transparent base having a first principal surface and a second principal surface opposite to the first principal surface;
   the low-reflection film formed on the first principal surface of the transparent base; and
   a black printed part formed on an outer peripheral part of the second principal surface of the transparent base,
   wherein the low-reflection film is provided on the first principal surface of the transparent base but not provided on the second principal surface of the transparent base, and the black printed part is provided on the second principal surface of the transparent base but not provided on the first principal surface of the transparent base,
   the black printed part is formed from a black ink directly printed on the second principal surface of the transparent base, where the black ink is an inorganic ink comprising a ceramic fired body, or an organic ink comprising dye or pigment and an organic resin, and
   a luminous reflectance R of the base with the low-reflection film with respect to incident light from the low-reflection film side is 2% or less in a region of the transparent base having the black printed part, and a ratio $R_1/R_2$ between a luminous reflectance $R_1$ of a surface of the low-reflection film and a luminous reflectance $R_2$ at an interface of the black printed part with the transparent base is ⅙ or more.

2. The base with the low-reflection film according to claim 1, wherein the luminous reflectance R of the base with the low-reflection film is 1.2% or less.

3. The base with the low-reflection film according to claim 1, wherein
the luminous reflectance $R_1$ of the surface of the low-reflection film is 1% or less.

4. The base with the low-reflection film according to claim 1, wherein
the luminous reflectance $R_2$ at the interface of the black printed part with the transparent base is 0.8% or less.

5. The base with the low-reflection film according to claim 1, wherein
the transparent base has a projecting and recessed shape on the first principal surface.

6. The base with the low-reflection film according to claim 5, wherein
a surface roughness RMS of the projecting and recessed shape is not less than 0.01 μm and not more than 0.5 μm.

7. The base with the low-reflection film according to claim 5, wherein
an average length RSm of a roughness curve element of the projecting and recessed shape is not less than 5 μm and not more than 30 μm.

8. The base with the low-reflection film according to claim 6, wherein
a haze value defined by JIS K 7136 of the transparent base is not less than 1% and not more than 30%.

9. The base with the low-reflection film according to claim 1, further comprising
an antifouling film formed on the low-reflection film and having a film thickness of not less than 2 nm and not more than 20 nm.

10. The base with the low-reflection film according to claim 1, wherein
the low-reflection film has at least one layer made of niobium oxide or silicon nitride, and at least one layer made of silicon oxide.

11. The base with the low-reflection film according to claim 1, wherein
the transparent base is a glass substrate.

12. The base with the low-reflection film according to claim 1, wherein the black printed part is formed such that the black printed part is visible from the low-reflection film side.

13. The base with the low-reflection film according to claim 1, wherein the black printed part is formed by a screen printing method using the black ink.

14. The base with the low-reflection film according to claim 1, consisting of the transparent base which is a glass substrate, the low-reflection film, the black printed part, and optionally an antifouling layer formed on the low-reflection film.

15. The base with the low-reflection film according to claim 1, wherein the black printed part is directly formed on the outer peripheral part of the second principal surface of the transparent base such that an entirety of a largest surface of the black printed part directly contacts the second principal surface of the transparent base.

16. The base with the low-reflection film according to claim 1, wherein the black ink is an inorganic ink comprising a ceramic fired body selected from the group consisting of an oxide, a carbide, carbon black, and mica.

\* \* \* \* \*